US012743045B2

(12) United States Patent
Sasaki

(10) Patent No.: US 12,743,045 B2
(45) Date of Patent: Sep. 22, 2026

(54) IMAGE FORMING APPARATUS, IMAGE FORMING APPARATUS RESET METHOD AND NON-TRANSITORY COMPUTER-READABLE RECORDING MEDIUM ENCODED WITH IMAGE FORMING APPARATUS RESET PROGRAM

(71) Applicant: KONICA MINOLTA, INC., Tokyo (JP)

(72) Inventor: Toshiyuki Sasaki, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 374 days.

(21) Appl. No.: 18/591,115

(22) Filed: Feb. 29, 2024

(65) Prior Publication Data

US 2024/0295848 A1 Sep. 5, 2024

(30) Foreign Application Priority Data

Mar. 3, 2023 (JP) ................................ 2023-033114

(51) Int. Cl.
*G03G 15/00* (2006.01)

(52) U.S. Cl.
CPC ..... *G03G 15/5029* (2013.01); *G03G 15/6502* (2013.01); *G03G 2215/00616* (2013.01)

(58) Field of Classification Search
None
See application file for complete search history.

(56) References Cited

U.S. PATENT DOCUMENTS

2016/0224293 A1 * 8/2016 Nakagawa ............ G06F 3/1231

FOREIGN PATENT DOCUMENTS

| | | | |
|---|---|---|---|
| JP | H0362028 | A | 3/1991 |
| JP | 2004117436 | A | 4/2004 |
| JP | 2007062963 | A | 3/2007 |
| JP | 2022089505 | A | 6/2022 |
| JP | 2022134792 | A | 9/2022 |
| JP | 2023021513 | A | 2/2023 |

OTHER PUBLICATIONS

Notice of Reasons for Refusal issued in Japanese Patent Application No. 2023-033114, dated Jun. 23, 2025, with English Translation (13 pages).

* cited by examiner

*Primary Examiner* — Miya J Cato
(74) *Attorney, Agent, or Firm* — Buchanan Ingersoll & Rooney PC

(57) ABSTRACT

An image forming apparatus includes an image former that forms an image on a recording medium in accordance with an image forming condition corresponding to a medium type of the recording medium, and a hardware processor, wherein the hardware processor detects information in regard to a medium type of a recording medium as first information, accepts information in regard to a medium type of a recording medium as second information, performs a reset work of setting at least one setting value that defines the image forming condition to a default value in response to satisfaction of a predetermined condition, and even when the reset work is performed, controls the image former to prevent accepted second information in regard to a predetermined recording medium from being reset.

20 Claims, 11 Drawing Sheets

| DETECTED BASIS WEIGHT [g/m²] | SHEET TYPE |
|---|---|
| 50～59 | THIN PAPER |
| 60～89 | PLAIN PAPER |
| 90～105 | PLAIN PAPER + |
| 106～159 | THICK PAPER 1 |
| 160～209 | THICK PAPER 2 |
| 210～259 | THICK PAPER 3 |
| 260～300 | THICK PAPER 4 |

*FIG.8*

| MEDIUM TYPE | VOLTAGE | CLASS |
|---|---|---|
| THIN PAPER | 1450 | CLASS 1 |
| PLAIN PAPER | 1650 | CLASS 2 |
| PLAIN PAPER + | 1850 | CLASS 3 |
| THICK PAPER 1 | 1550 | CLASS 4 |
| THICK PAPER 1+ | 1550 | |
| THICK PAPER 2 | 1950 | CLASS 5 |
| THICK PAPER 3 | 1950 | |
| THICK PAPER 4 | 1950 | |

*FIG.9*

| MEDIUM TYPE | TEMPERATURE[°C] | CLASS |
|---|---|---|
| THIN PAPER | 130 | CLASS 1 |
| PLAIN PAPER | 135 | CLASS 2 |
| PLAIN PAPER + | 140 | CLASS 3 |
| THICK PAPER 1 | 140 | |
| THICK PAPER 1+ | 140 | |
| THICK PAPER 2 | 140 | |
| THICK PAPER 3 | 145 | CLASS 4 |
| THICK PAPER 4 | 145 | |

FIG.10

| MEDIUM TYPE | SPEED[mm/s] | CLASS |
|---|---|---|
| THIN PAPER | 165 | CLASS 1 |
| PLAIN PAPER | 165 | |
| PLAIN PAPER + | 165 | |
| THICK PAPER 1 | 82.5 | CLASS 2 |
| THICK PAPER 1+ | 82.5 | |
| THICK PAPER 2 | 82.5 | |
| THICK PAPER 3 | 82.5 | |
| THICK PAPER 4 | 82.5 | |

FIG.13

| | BEFORE RESET | | AFTER RESET | |
|---|---|---|---|---|
| | MEDIUM TYPE | WORK MODE | MEDIUM TYPE | WORK MODE |
| TRAY 1 | PLAIN PAPER | DETECTION MODE | UNKNOWN | DETECTION MODE |
| TRAY 2 | PLAIN PAPER + | SETTING MODE | PLAIN PAPER + | SETTING MODE |
| TRAY 3 | THICK PAPER | SETTING MODE | UNKNOWN | DETECTION MODE |

IMAGE FORMING APPARATUS, IMAGE FORMING APPARATUS RESET METHOD AND NON-TRANSITORY COMPUTER-READABLE RECORDING MEDIUM ENCODED WITH IMAGE FORMING APPARATUS RESET PROGRAM

CROSS-REFERENCE TO RELATED APPLICATIONS

The entire disclosure of Japanese patent Applications No. 2023-033114 filed on Mar. 3, 2023 is incorporated herein by reference in its entirety.

BACKGROUND OF THE INVENTION

Technical Field

The present invention relates to an image forming apparatus, an image forming apparatus reset method and a non-transitory computer-readable recording medium encoded with an image forming apparatus reset program. In particular, the present invention relates to an image forming apparatus capable of forming images on recording media of different medium types, an image forming apparatus reset method to be performed in the image forming apparatus, and a non-transitory computer-readable recording medium encoded with an image forming apparatus reset program that causes a computer that controls the image forming apparatus to perform the image forming apparatus reset method.

Description of Related Art

In an image forming apparatus such as a Multi-functional Peripheral (MFP), the image quality of an image to be formed on a sheet is influenced by the basis weight of the sheet. Therefore, the MFP may set different image forming conditions in accordance with the basis weight of a sheet on which an image is to be formed. Therefore, an image forming apparatus including a function of detecting the type of a sheet during conveyance of the sheet is known.

For example, Japanese Unexamined Patent Publication No. 2007-62963 describes a sheet selection control device of an image forming apparatus, wherein the sheet selection control device is a control device for controlling selection of a type of a sheet that is to be printed in an image forming apparatus, and includes a sheet type accepting means for accepting an externally designated type of a sheet, a sheet stage selecting means for selecting a first sheet feed stage storing the designated sheet from among a plurality of sheet feed stages prepared in the image forming apparatus; a sheet type detection means for detecting types of sheets conveyed for image formation from the first sheet feed stage one by one, and a print stopping means for stopping printing in a case in which information about a sheet type detected by the sheet type detection means and information about a sheet type accepted by the sheet type accepting means are compared to each other and are different from each other. According to the image forming apparatus described in Japanese Unexamined Patent Publication No. 2007-62963, it is detected that the externally designated type of a sheet and the type of sheet on which an image is formed are different from each other. Therefore, it is possible to detect that the sheets stored in the first sheet feed stage designated by the user do not belong to a single type.

In order to ensure the accuracy of detection of a sheet type during conveyance of a sheet, it is necessary to make a conveyance speed at which the sheet is to be conveyed be slower than a conveyance speed at which an image is formed on the sheet. Therefore, in order to form an image on a sheet without identification of the type of a sheet being conveyed, a sheet feed tray that stores a sheet may be associated with the type of the sheet stored therein. In this case, because it is not necessary to identify a sheet type during conveyance, it is possible to convey a sheet at a conveyance speed at which an image is formed and shorten a period of time required for image formation as much as possible.

On the other hand, the type of a sheet stored in the sheet feed tray may be changed. Therefore, it is desirable to reset the sheet type associated with the sheet feed tray at a predetermined point in time and identify the sheet type of a sheet being conveyed before image formation. The predetermined point in time is a point in time at which the sheet feed tray is opened or closed, for example.

However, in regard to a sheet having a specific sheet type, accuracy of detection of a sheet type during conveyance varies, and erroneous detection may be highly probable. There is a problem that, when a sheet type is erroneously detected during conveyance of a sheet after the sheet type associated with the sheet feed tray storing the sheet having such a specific sheet type is reset, it may not be possible to form an image in accordance with correct image forming conditions.

SUMMARY OF THE INVENTION

According to one aspect of the present invention, an image forming apparatus includes an image former that forms an image on a recording medium in accordance with an image forming condition corresponding to a medium type of the recording medium, and a hardware processor, wherein the hardware processor detects information in regard to a medium type of a recording medium as first information, accepts information in regard to a medium type of a recording medium as second information, performs a reset work of setting at least one setting value that defines the image forming condition to a default value in response to satisfaction of a predetermined condition, and even when the reset work is performed, controls the image former to prevent accepted second information in regard to a predetermined recording medium from being reset.

According to another aspect of the present invention, an image forming apparatus reset method causes an image forming apparatus to perform an image forming step of forming an image on a recording medium in accordance with an image forming condition corresponding to a medium type of the recording medium, a detecting step of detecting information in regard to a medium type of a recording medium as first information, a type acquiring step of accepting information in regard to a medium type of a recording medium as second information, a resetting step of performing a reset work of setting at least one setting value that defines the image forming condition to a default value in response to satisfaction of a predetermined condition, and a restricting step of, even when a reset work is performed in the resetting step, controlling the image forming apparatus to prevent second information in regard to a predetermined recording medium accepted in the type acquiring step from being reset.

According to yet another aspect of the present invention, a non-transitory computer-readable recording medium encoded with an image forming apparatus reset program causes a computer controlling an image forming apparatus to perform an image forming step of forming an image on a recording medium in accordance with an image forming condition corresponding to a medium type of the recording medium, a detecting step of detecting information in regard to a medium type of a recording medium as first information, a type acquiring step of accepting information in regard to a medium type of a recording medium as second information, a resetting step of performing a reset work of setting at least one setting value that defines the image forming condition to a default value in response to satisfaction of a predetermined condition, and a restricting step of, even when a reset work is performed in the reset step, controlling the image forming apparatus to prevent second information in regard to a predetermined recording medium accepted in the type acquiring step from being reset.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 8 is a diagram illustrating one example of a secondary transfer voltage table;

FIG. 9 is a diagram illustrating one example of a fixing temperature table;

FIG. 10 is a diagram illustrating one example of a sheet conveyance speed table;

FIG. 13 is a diagram illustrating one example of setting values before and after execution of a reset process.

DETAILED DESCRIPTION

Figure 1:
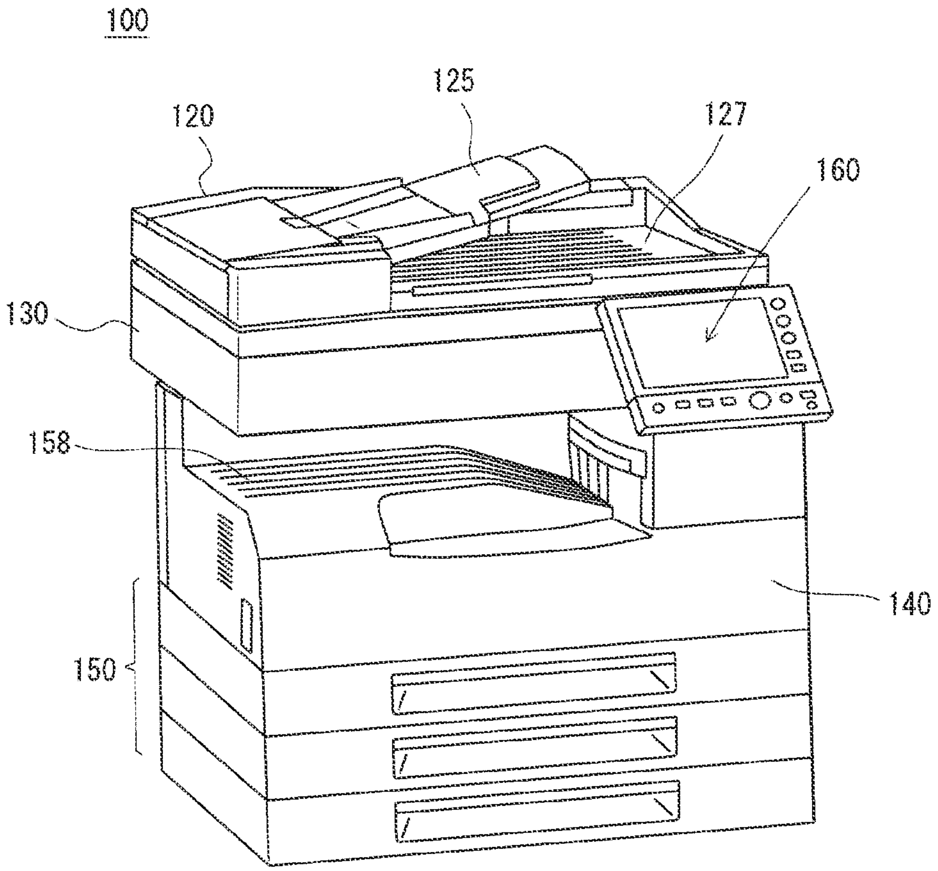
FIG. 1 is a perspective view illustrating the appearance of an MFP in the present embodiment.

Hereinafter, one or more embodiments of the present invention will be described with reference to the drawings. However, the scope of the invention is not limited to the disclosed embodiments.

An image forming apparatus in embodiments of the present invention will be described below with reference to the drawings. In the following description, the same components are denoted by the same reference numerals. Their names and functions are also the same. Therefore, a detailed description thereof will not be repeated. Further, in the following description, an MFP will be described as one example of the image forming apparatus. Further, the below-mentioned MFP can form an image on any of a plurality of types of recording media of different medium types as a recording medium on which an image is to be formed.

The medium type is information about a recording medium, and includes a basis weight, presence or absence of image formation and a material. In the present embodiment, the medium type includes a first medium type defined by a basis weight, a second medium type defined by the presence or absence of image formation and a third medium type defined by a material. The first medium type includes "THIN PAPER," "PLAIN PAPER" or "THICK PAPER" having different basis weights. The second medium type includes "PRINTED PAPER" indicating a recording medium on which an image is formed and "ABSENCE OF IMAGE FORMATION" indicating that no image is formed. The third medium type includes "SHEET" indicating that the material is paper and "OHP" indicating that the material is polyethylene such as Poly Ethylene Terephthalate (PET). Hereinafter, in a case in which the second medium type is "ABSENCE OF IMAGE FORMATION" and the third medium type is "SHEET," the medium type of a recording medium is referred to as "THIN PAPER" when the first medium type is "THIN PAPER," the medium type of a recording medium is referred to as "PLAIN PAPER" when the first medium type is "PLAIN PAPER," the medium type of a recording medium is referred to as "THICK PAPER 1" when the first medium type is "THICK PAPER 1," the medium type of a recording medium is referred to as "THICK PAPER 2" which has a larger basis weight than that of "THICK PAPER 1" when the first medium type is "THICK PAPER 2," the medium type of a recording medium is referred to as "THICK PAPER 3" which has a larger basis weight than that of "THICK PAPER 2" when the first medium type is "THICK PAPER 3" and the medium type of a recording medium is referred to as "THICK PAPER 4" which has a larger basis weight than that of "THICK PAPER 3" when the first medium type is "THICK PAPER 4." Further, in a case in which the second medium type is "PRESENCE OF IMAGE FORMATION" and the third medium type is "SHEET," the medium type of a recording medium is referred to as "THIN PAPER+" when the first medium type is "THIN PAPER," the medium type of a recording medium is referred to as a "PLAIN PAPER+" when the first medium type is "PLAIN PAPER," the medium type of a recording medium is referred to as a "THICK PAPER 1+" when the first medium type is "THICK PAPER 1," the medium type of a recording medium is referred to as "THICK PAPER 2+" when the first medium type is "THICK PAPER 2," the medium type of a recording medium is referred to as "THICK PAPER 3+" when the first medium type is "THICK PAPER 3+" and the medium type of a recording medium is referred to as "THICK PAPER 4+" when the first medium type is "THICK PAPER 4." In a case in which the medium type of a recording medium is "PRINTED PAPER," the second medium type is "PRESENCE OF IMAGE FORMATION," the third medium type is "SHEET" and the first medium type includes recording media of three types which are "THIN PAPER," "PLAIN PAPER" and "THICK PAPER." Further, in a case in which the third medium type is "OHP," the medium type of a recording medium is simply referred to as "OHP."

Figure 2:
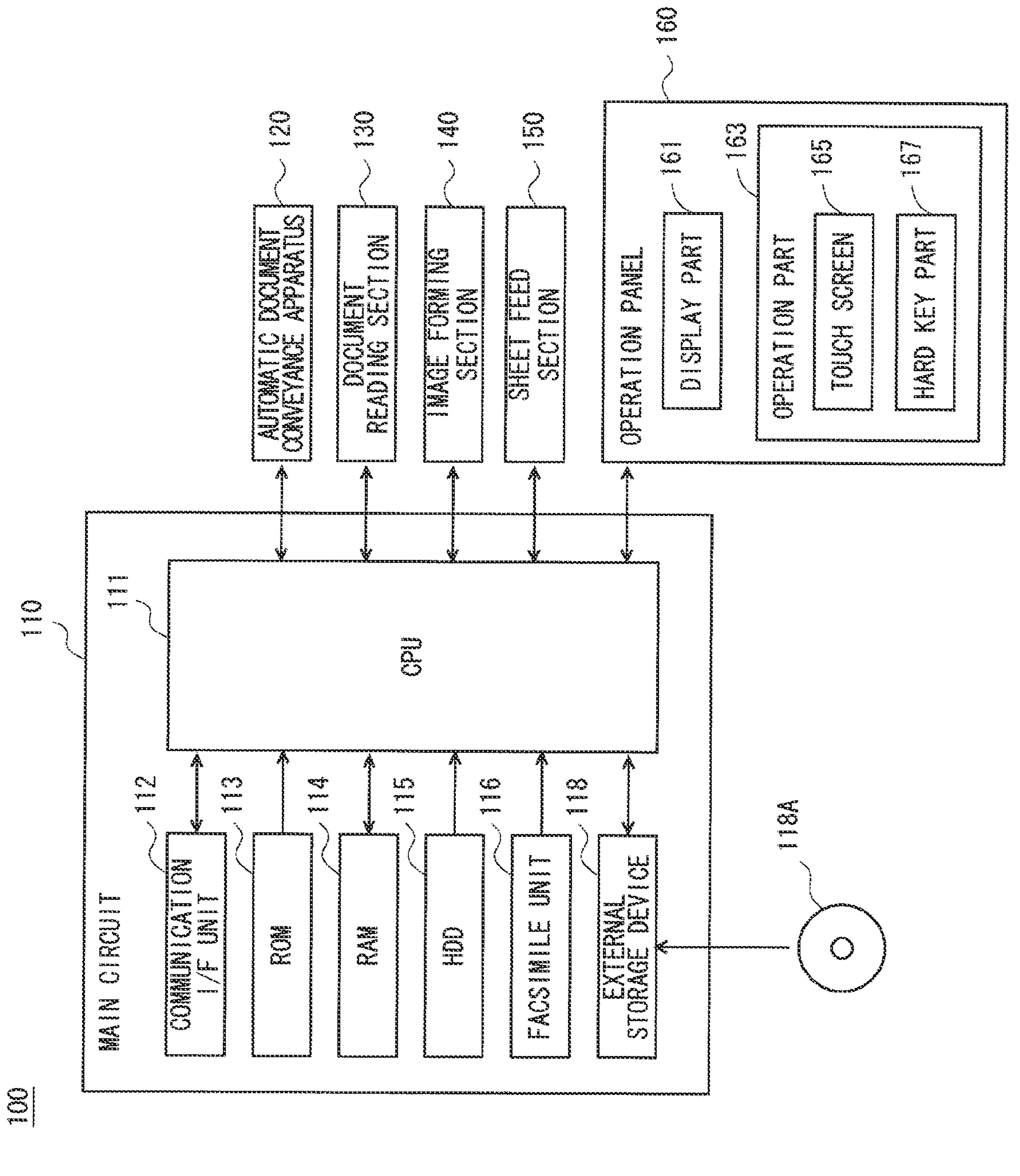
FIG. 2 is a block diagram illustrating the outline of a hardware configuration of the MFP in the present embodiment.

FIG. 1 is a perspective view illustrating the appearance of the MFP in the present embodiment. FIG. 2 is a block diagram illustrating the outline of a hardware configuration of the MFP in the present embodiment. With reference to FIGS. 1 and 2, the MFP 100 is one example of an image forming apparatus, and includes a main circuit 110, a document reading section 130 for reading a document, an automatic document conveyance apparatus 120 for conveying a document to the document reading section 130, the image forming section (i.e., image former) 140 for forming an image on a recording medium based on image data, the sheet feed section 150 for feeding a recording medium to the image forming section 140 and an operation panel 160 serving as a user interface.

The automatic document conveyance apparatus 120 automatically conveys a plurality of documents set on a document tray 125 to a document reading position of the document reading section 130 one by one, and discharges a document having an image formed thereon and read by the document reading section 130 onto a document ejection tray 127. The automatic document conveyance apparatus 120 includes a document detection sensor for detecting a document placed on the document tray 125.

The document reading section 130 has a rectangular reading surface for reading a document. The reading surface is formed of a platen glass, for example. The automatic document conveyance apparatus 120 is connected to the main body of the MFP 100 to be rotatable about an axis parallel to one side of the reading surface and is openable and closable. The document reading section 130 is arranged below the automatic document conveyance apparatus 120, and the reading surface of the document reading section 130 is exposed with the automatic document conveyance apparatus 120 rotated and open. Thus, a user can place a document on the reading surface of the document reading section 130. The automatic document conveyance apparatus 120 can change between an open state in which the reading surface of the document reading section 130 is exposed and a close state in which the reading surface is covered. The automatic document conveyance apparatus 120 includes a state detection sensor for detecting the open state of the automatic document conveyance apparatus 120.

The document reading section 130 includes a light source that emits light and an optoelectronic transducer that receives light, and scans an image formed on a document placed on the reading surface. In a case in which a document is placed on a reading area, the light emitted from the light source is reflected from the document, and the reflected light forms an image on the optoelectronic transducer. When receiving the light reflected from the document, the optoelectronic transducer produces image data by converting the received light into an electrical signal. The document reading section 130 outputs the image data to a Central Processing Unit (CPU) 111 included in the main circuit 110.

The sheet feed section 150 conveys a recording medium stored in any of first to third sheet feed trays and a manual sheet feed tray, described below, to the image forming section 140. The sheet feed section 150 detects information about a recording medium to be conveyed to the image forming section 140 as medium information. In the present embodiment, the medium information is the basis weight of a recording medium. Details of the configuration and work for detection of the medium information in the sheet feed section 150 will be described below.

The image forming section 140 is controlled by the CPU 111 and forms an image using a well-known electrophotographic method. In the present embodiment, the image forming section 140 forms an image on a recording medium conveyed by the sheet feed section 150 based on image data received from the CPU 111 and a command signal provided from the CPU 111 based on the medium information detected in the sheet feed section 150. A recording medium on which an image is formed is discharged to a sheet ejection tray 158. The image data that is output by the CPU 111 to the image forming section 140 includes image data such as externally received print data in addition to image data received from the document reading section 130.

The main circuit 110 includes the CPU 111 for controlling the MFP 100 as a whole, a communication interface (I/F) unit 112, a Read Only Memory (ROM) 113, a Random Access Memory (RAM) 114, a Hard Disc Drive (HDD) 115 that is used as a mass storage device, a facsimile unit 116 and an external storage device 118. The CPU 111 is connected to the automatic document conveyance apparatus 120, the document reading section 130, the image forming section 140, the sheet feed section 150 and the operation panel 160, and controls the MFP 100 as a whole.

The ROM 113 stores a program to be executed by the CPU 111 or data required for execution of the program. The RAM 114 is used as a workspace when the CPU 111 executes a program. Further, the RAM 114 temporarily stores image data successively transmitted from the document reading section 130.

The operation panel 160 is provided in an upper portion of the MFP 100. The operation panel 160 includes a display part 161 and an operation part 163. The display part 161 is a Liquid Crystal Display Device (LCD), for example, and displays an instruction menu for a user, information about acquired image data, etc. As long as displaying images, an organic Electroluminescence (EL) display, for example, can be used instead of an LCD.

The operation part 163 includes a touch screen 165 and a hard key part 167. The touch screen 165 is a capacitance type. The touch screen 165 is not limited to the capacitance type, and another type such as a resistive film type, a surface acoustic wave type, an infrared type and an electromagnetic induction type can be used.

The touch screen 165 is provided with its detection surface being superimposed on an upper surface or a lower surface of the display part 161. Here, the size of the detection surface of the touch screen 165 and the size of the display surface of the display part 161 are the same. Therefore, the coordinate system of the display surface and the coordinate system of the detection surface are the same. The touch screen 165 detects a position designated by the user on the display surface of the display part 161 using the detection surface, and outputs a set of coordinates of the detected position to the CPU 111. Because the coordinate system of the display surface and the coordinate system of the detection surface are the same, the set of coordinates output by the touch screen 165 can be replaced with the set of coordinates of the display surface.

The hard key part 167 includes a plurality of hardkeys. The hard keys are contact switches, for example. The touch screen 165 detects a position designated by the user on the display surface of the display part 161. In a case in which operating the MFP 100, the user is likely to be in an upright posture. Therefore, the display surface of the display part 161, the operation surface of the touch screen 165 and the hard key part 167 are arranged to face upwardly. This is for the purpose of enabling the user to easily view the display surface of the display part 161 and easily provide an instruction on the operation part 163 with his or her finger.

The communication I/F unit 112 is an interface for connecting the MFP 100 to a network. The communication I/F unit 112 communicates with another computer or a data processing apparatus connected to the network with a communication protocol such as Transmission Control Protocol (TCP) or File Transfer Protocol (FTP). The network to which the communication I/F unit 112 is connected is a Local Area Network (LAN), and its connection form is either wired or wireless. Further, the network is not limited to a LAN and may be a Wide Area Network (WAN), a Public Switched Telephone Network (PSTN), the Internet or the like.

The facsimile unit 116 is connected to the Public Switched Telephone Network (PSTN), transmits facsimile data to the PSTN or receives facsimile data from the PSTN. The facsimile unit 116 stores the received facsimile data in the HDD 115, converts the facsimile data into print data that is printable in the image forming section 140 and outputs the print data to the image forming section 140. Thus, the image forming section 140 forms an image represented by the facsimile data received from the facsimile unit 116 on a recording medium. Further, the facsimile unit 116 converts the data stored in the HDD 115 into facsimile data and transmits the converted facsimile data to a facsimile machine connected to the PSTN.

The external storage device 118 is controlled by the CPU 111 and mounted with a Compact Disk Read Only Memory (CD-ROM) 118A or a semiconductor memory. While the CPU 111 executes a program stored in the ROM 113 by way of example in the present embodiment, the CPU 111 may control the external storage device 118, read a program to be executed by the CPU 111 from the CD-ROM 118A and store the read program in the RAM 114 for execution.

It is noted that a recording medium for storing a program to be executed by the CPU 111 is not limited to the CD-ROM 118A. It may be a flexible disc, a cassette tape, an optical disc (Magnetic Optical Disc (MO)/Mini Disc (MD)/Digital Versatile Disc (DVD)), an IC card, an optical card, and a semiconductor memory such as a mask ROM and an Erasable Programmable ROM (EPROM). Further, the CPU 111 may download a program from a computer connected to the network and store the program in the HDD 115, or the computer connected to the network may write the program in the HDD 115. Then, the program stored in the HDD 115 may be loaded into the RAM 114 to be executed by the CPU 111. The program referred to here includes not only a program directly executable by the CPU 111 but also a source program, a compressed program, an encrypted program and the like.

Figure 3:
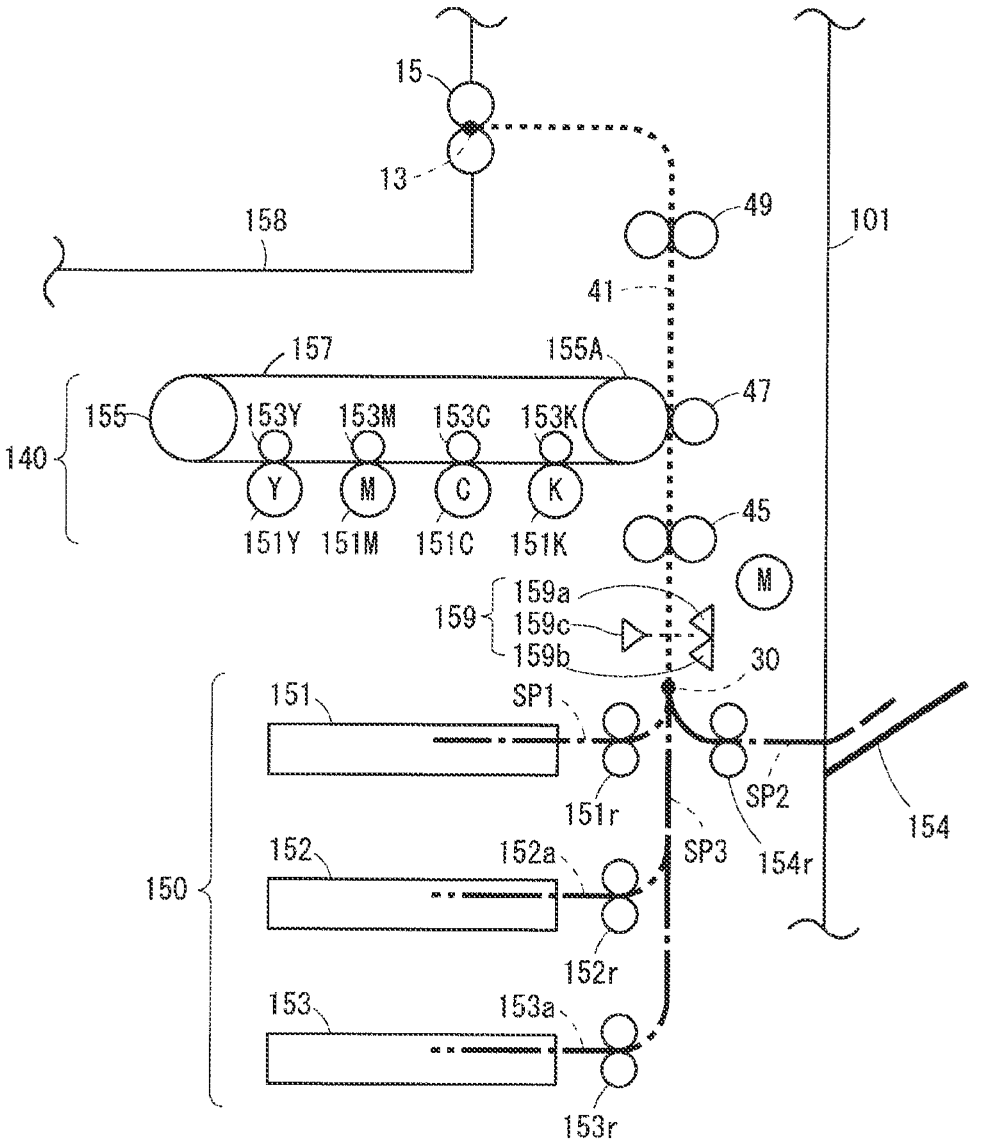
FIG. 3 is a schematic side view illustrating an inner configuration of part of an image forming section and a sheet feed section included in the MFP in the present embodiment.

FIG. 3 is a schematic side view illustrating the inner configuration of part of the image forming section and the sheet feed section included in the MFP in the present embodiment. With reference to FIG. 3, a main conveyance path 41 indicated by the thick dotted line is formed to basically extend in an up-down direction in the MFP 100. The main conveyance path 41 is a path for guiding a recording medium that is conveyed from the sheet feed section 150 to the sheet ejection tray 158 through the image forming section 140. In the main conveyance path 41 of the present example, a lower end portion 30 opposite to an upper end portion 13 located at a position farther upward than the image forming section 140 forms an inlet port for receiving a recording medium from the sheet feed section 150. Further, the upper end portion 13 of the main conveyance path 41 forms an outlet port for discharging a recording medium on which an image has been formed to the sheet ejection tray 158. A sheet ejection roller 15 is provided at the upper end portion 13 of the main conveyance path 41. The lower end portion 30 of the main conveyance path 41 is connected to a plurality of sub-conveyance paths SP1, SP2, SP3 of the sheet feed section 150, described below. The conveyance direction of a recording medium is a direction directed from the sheet feed section 150 to the sheet ejection tray 158.

The sheet feed section 150 includes three sheet feed trays 151, 152, 153 and a manual sheet feed tray 154. The three sheet feed trays 151, 152, 153 are arranged in a stack in this order from above toward below. The manual sheet feed tray 154 is provided at a sidewall 101 of the MFP 100 and located at a position farther downward than the image forming section 140. As indicated by the thick one-dot and dash lines in FIG. 3, in the sheet feed section 150, the sub-conveyance path SP1 is formed so as to extend from the sheet feed tray 151, which is the top tray among the three sheet feed trays 151, 152, 153, to the lower end portion 30 of the main conveyance path 41. Further, the sub-conveyance path SP2 is formed so as to extend from the manual sheet feed tray 154 to the lower end portion 30 of the main conveyance path 41. Further, two conveyance paths 152*a*, 153*a* that respectively extend from the sheet feed trays 152, 153, which are the middle and bottom trays among the three sheet feed trays 151, 152, 153, to the lower end portion 30 of the main conveyance path 41 are formed. Portions of the two respective conveyance paths 152*a*, 153*a* having a predetermined length from the lower end portion 30 of the main conveyance path 41 are a sub-conveyance path SP3 shared by the two conveyance paths 152*a*, 153*a*.

The sub-conveyance path SP1 is provided with a sheet feed roller 151*r* for feeding a recording medium stored in the sheet feed tray 151 to the main conveyance path 41. The sub-conveyance path SP2 is provided with a sheet feed roller 154*r* for feeding a recording medium stored in the manual sheet feed tray 154 to the main conveyance path 41. The conveyance path 152*a* is provided with a sheet feed roller 152*r* for feeding a recording medium stored in the sheet feed tray 152 to the main conveyance path 41 through the sub-conveyance path SP3. Further, the conveyance path 153*a* is provided with a sheet feed roller 153*r* for feeding a recording medium stored in the sheet feed tray 153 to the main conveyance path 41 through the sub-conveyance path SP3.

In the MFP 100, when an image is formed on a recording medium, a cassette storing a recording medium on which an image is to be formed is selected from among the three sheet feed trays 151, 152, 153 and the manual sheet feed tray 154 as a target cassette. The sheet feed roller corresponding to the cassette selected as a target cassette from among the three sheet feed trays 151, 152, 153 and the manual sheet feed tray 154 works, so that a recording medium on which an image is to be formed is fed from the cassette selected as the target cassette to the main conveyance path 41 through one of the sub-conveyance paths SP1, SP2, SP3.

The image forming section 140 includes respective image forming units 141Y, 141M, 141C, 141K for respective yellow, magenta, cyan and black. At least one of the image forming units 141Y, 141M, 141C, 141K is driven, so that an image is formed. When all of the image forming units 141Y, 141M, 141C, 141K are driven, a full-color image is formed. The printing data for yellow, magenta, cyan and black are respectively input to the image forming units 141Y, 141M, 141C, 141K. The only difference among the image forming units 141Y, 141M, 141C, 141K is the colors of toners used by the image forming units 141Y, 141M, 141C, 141K. Therefore, the image forming unit 141Y for forming an image in yellow will be described here.

The image forming unit 141Y includes an exposure head to which printing data for yellow is input, a photosensitive drum (an image bearing member), an electric charger, a developing device and a transfer roller 143Y. The exposure head emits laser light in accordance with the received printing data (electrical signal). A polygon mirror included in the exposure head scans the emitted laser light one-dimensionally to expose the photosensitive drum. The direction in which the laser light one-dimensionally scans the photosensitive drum is a main scanning direction. After being electrically charged by the electric charger, the photosensitive drum is irradiated with the laser light emitted by the exposure head. Thus, an electrostatic latent image is formed on the photosensitive drum. Subsequently, toner is applied onto the electrostatic latent image by the developing device, and a toner image is formed. The toner image formed on the photosensitive drum is transferred onto an intermediate transfer belt 147 by the transfer roller 143Y.

On the other hand, the intermediate transfer belt 147 is suspended by a driving roller 145 and a roller 145A not to loosen. When the driving roller 145 is rotated counterclockwise in the diagram, the intermediate transfer belt 147 is rotated counterclockwise in the diagram at a predetermined speed. The roller 145A is rotated counterclockwise due to the rotation of the intermediate transfer belt 147.

Thus, the image forming units 141Y, 141M, 141C, 141K sequentially transfer toner images onto the intermediate transfer belt 147. Timing for transferring toner images onto the intermediate transfer belt 147 by the respective image forming units 141Y, 141M, 141C, 141K is adjusted by detection of a reference mark provided on the intermediate transfer belt 147. Thus, yellow, magenta, cyan and black toner images are superimposed on the intermediate transfer belt 147.

In the above-mentioned main conveyance path 41, a timing roller 45, a transfer roller 47 and a fixing roller 49 are arranged in this order at intervals from the lower end portion 30 to the upper end portion 13. A recording medium that has been fed from the sheet feed section 150 to the main conveyance path 41 is sent to the timing roller 45.

The timing roller 45 adjusts the conveyance state of the recording medium in the main conveyance path 41 such that the recording medium arrives at the transfer roller 47 at a point in time at which a toner image formed on the intermediate transfer belt 147 arrives at the transfer roller 47. A recording medium conveyed by the timing roller 45 is pressed against the intermediate transfer belt 147 by the transfer roller 47, and the transfer roller 47 is electrically charged. Thus, yellow, magenta, cyan and black toner images that are formed on the intermediate transfer belt 147 in a superimposed manner are transferred to the recording medium. A voltage to be applied to the transfer roller 47 is controlled by the CPU 111 such that the charge amount of the transfer roller 47 is a value suitable for the basis weight of the recording medium.

The recording medium to which the toner image has been transferred is conveyed to the fixing roller 49 and heated by the fixing roller 49. Thus, the toner is melted and fixed to the recording medium. Thereafter, the recording medium on which an image has been formed is discharged onto the sheet ejection tray 158 from the upper end portion 13 of the main conveyance path 41 by the sheet ejection roller 15. The temperature and the distance between rollers of the fixing roller 49 are controlled by the CPU 111 to be values suitable for the basis weight of the recording medium.

Each of the sheet feed rollers 151*r* to 154*r* and the timing roller 45 is configured such that a driving force of one motor M is transmitted to each of the sheet feed rollers 151*r* to 154*r* and the timing roller 45 via a gear. Further, a driving force of another motor different from the motor M is transmitted to each of the transfer roller 47, the fixing roller 49 and the sheet ejection roller 15 via a gear. A clutch is provided in the power transmission path between the motor M and the timing roller 45, and a clutch is provided in the power transmission path between the motor M and each of the sheet feed rollers 151*r* to 154*r*. Each of the timing roller 45 and the sheet feed rollers 151*r* to 154*r* is switched between a state in which the corresponding clutch is disconnected and a state in which the corresponding clutch is connected, whereby the transmission of the driving force of the motor M is switched.

In the MFP 100 in the present embodiment, a detection device 159 having a detection area in the main conveyance path 41 is provided. The detection device 159 includes light emitters 159*a*, 159*b* and a light receiver 159*c*, and is arranged at a position between the lower end portion 30 of the main conveyance path 41 and the timing roller 45 such that the light emitters 159*a*, 159*b* are opposite to the light receiver 159*c* with the main conveyance path 41 located therebetween.

Figure 4:
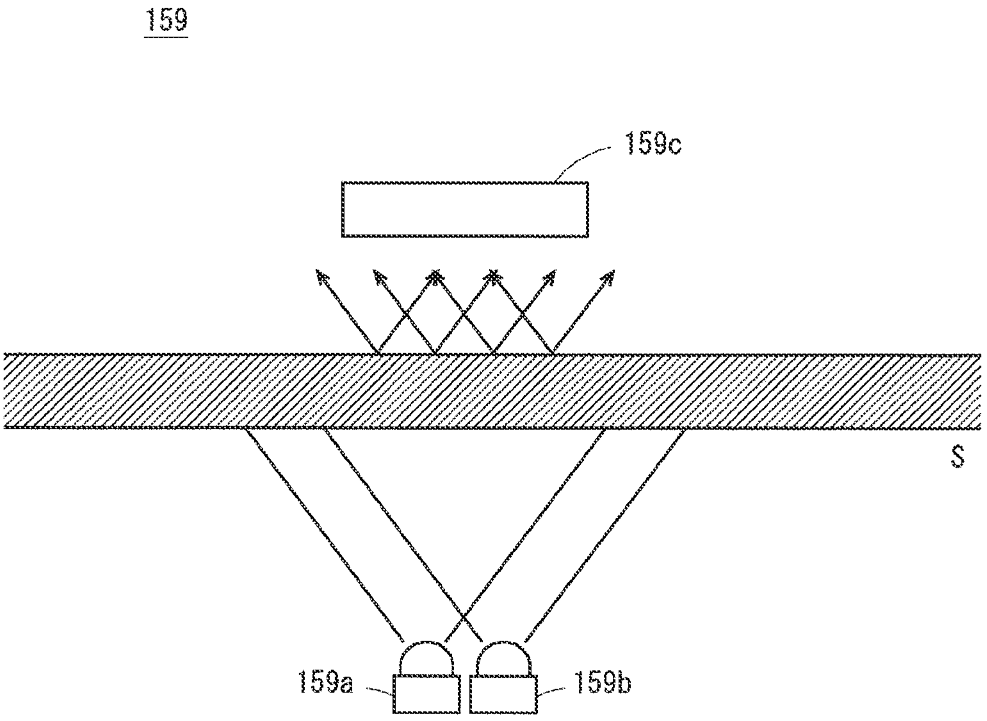
FIG. 4 is a diagram for explaining the detailed configuration of a detection device.

FIG. 4 is a diagram illustrating a detailed configuration of the detection device. The detection device 159 is an optical sensor including the light emitters 159*a*, 159*b* and the light receiver 159*c*. Each of the light emitters 159*a*, 159*b* includes a light emitting element such as a light emitting diode, a drive circuit for the light emitting element and an optical system, and emits light along its optical axis. In the present embodiment, the light emitter 159*a* includes a near infrared Light Emitting Diode (LED). The light emitter 159*b* includes a blue LED. The area in the main conveyance path 41 extending along the optical axes of the light emitters 159*a*, 159*b* is a detection area.

The light receiver 159*c* includes a light receiving element such as a photodiode, and outputs a signal corresponding to the light reception amount of light received by the light receiving element. The detection area of the detection device 159 is the area between the light emitters 159*a*, 159*b* and the light receiver 159*c*. In a period during which a recording medium S is moved through the main conveyance path 41 and crosses the detection area, part of the moving recording medium S is irradiated with light emitted from the light emitters 159*a*, 159*b*. At this time, part of the light emitted to the recording medium S is transmitted through the recording medium S, and the rest of the light emitted to the recording medium S is absorbed by the recording medium S or reflected from the recording medium S. The light receiver 159*c* receives the light transmitted through the recording medium S and outputs a signal corresponding to the light reception amount to the CPU 111.

Figures 5, 6:
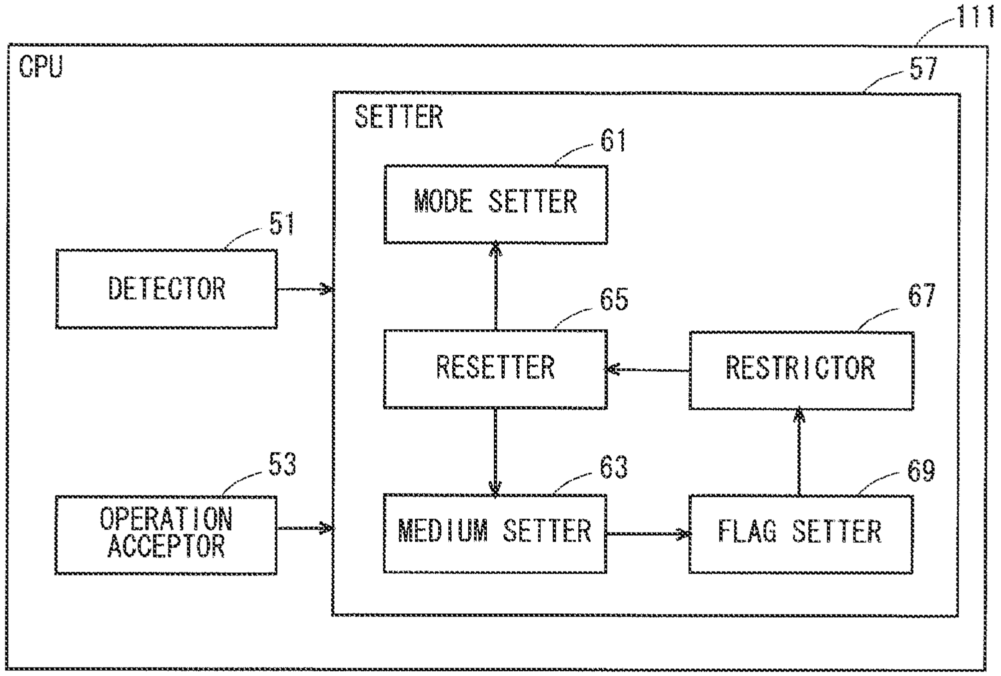
FIG. 5 is a block diagram illustrating one example of functions of a CPU included in the MFP in the present embodiment.
FIG. 6 is a diagram illustrating one example of a correspondence table.

FIG. 5 is a block diagram illustrating one example of the functions of the CPU included in the MFP in the present embodiment. The functions illustrated in FIG. 5 are implemented by the CPU 111 in a case in which the CPU 111 included in the MFP 100 executes an image forming control program stored in the ROM 113, the HDD 115 or the CD-ROM 118A.

Here, recording media the medium type of which is "PLAIN PAPER" are stored in the sheet feed tray 151, recording media the medium type of which is "PLAIN PAPER+" are stored in the sheet feed tray 152, recording media the medium type of which is "THICK PAPER 1" are stored in the sheet feed tray 153, and no recording medium is stored in the manual sheet feed tray 154, by way of example.

With reference to FIG. 5, the CPU 111 includes a detector 51, an operation acceptor 53, a setter 57 and a flag setter 55. The detector 51 controls the detection device 159 to detect the medium type of the recording medium S conveyed through the main conveyance path 41. The detector 51 outputs the detected medium type to the setter 57.

The detector 51 controls the detection device 159 to determine a transmittance TR of the recording medium S in a period during which the recording medium S fed from the sheet feed section 150 to the main conveyance path 41 is moved in the detection area of the detection device 159. Specifically, the detector 51 acquires an output signal of the light receiver 159*c* of the detection device 159, calculates a light reception amount based on the output signal and calculates the ratio of the light amount of light received by the light receiver 159*c* with respect to the light amount of light emitted by the light emitters 159*a*, 159*b* as a transmittance TR. The detector 51 determines the medium type of the recording medium S based on the calculated transmittance TR. The detector 51 determines the basis weight with respect to the transmittance TR using conversion information. The conversion information is the information that defines the correspondence between the basis weight and the transmittance. The conversion information is produced in advance by an experiment or the like, and is stored in the HDD 115. Further, the detector 51 determines the medium type with respect to the basis weight determined based on the transmittance TR with reference to a correspondence table stored in the HDD 115.

The operation acceptor 53 controls the operation part 163 and receives an operation that is input by the user to the operation part 163. The operation acceptor 53 outputs the operation accepted by the operation part 163 to the setter 57. With a sheet feed tray setting screen displayed on the display part 161, the operation acceptor 53 accepts a setting value corresponding to one of the sheet feed trays 151 to 153 and the manual sheet feed tray 154. Setting values include a sheet size indicating the size of a recording medium, the medium type of a recording medium and a work mode. The work mode includes a first work mode and a second work mode. The first work mode is a detection mode in which the medium type of a recording medium is determined based on the output of the detection device 159. The second work mode is a setting mode in which the medium type of a recording medium is determined not based on the output of the detection device 159.

FIG. 6 is a diagram illustrating one example of the correspondence table. The correspondence table is produced when the range of the basis weight of a recording medium of a medium type is obtained by an experiment or the like in regard to each of the plurality of medium types. With reference to FIG. 6, the correspondence table associates a medium type with the range of the basis weight of a recording medium having the medium type.

Figure 7:
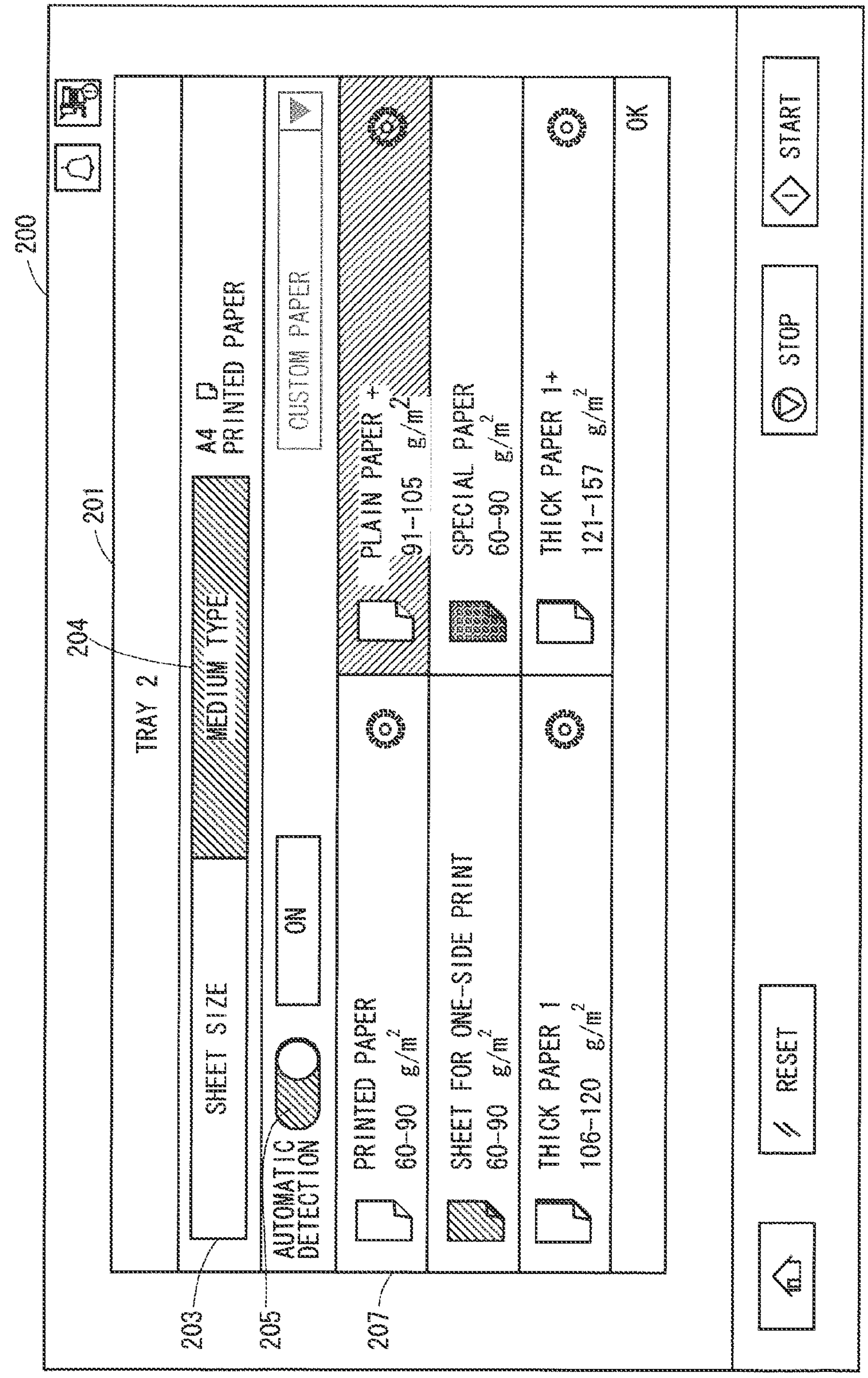
FIG. 7 is a diagram illustrating one example of a sheet feed tray setting screen.

FIG. 7 is a diagram illustrating one example of a sheet feed tray setting screen. The sheet feed tray setting screen 200 includes an area 201 for selection of one of the sheet feed trays 151 to 153 and the manual sheet feed tray 154, a tab 203 in which the character string for a sheet size is indicated, a tab 204 in which the character string for a medium type is indicated, a work mode setting area 205 and a setting area 207. Here, the names "TRAY 1," "TRAY 2," "TRAY 3" and "MANUAL SHEET FEED TRAY" are provided for the sheet feed trays 151 to 153 and the manual sheet feed tray 154.

In the area 201, the characters for the tray 2 are displayed, and it illustrates that the sheet feed tray 152 is being selected. In the area 201, a pull-down menu is displayed, and the other sheet feed trays 151, 153 and the manual sheet feed tray 154 are selectable.

The tabs 203, 204 are exclusively selectable. Here, application of hatching to the tab 204 illustrates that the tab 204 is being selected. With the tab 204 selected, the screen for setting of a medium type is displayed in the setting area 207. On the screen for setting a medium type, a plurality of buttons respectively indicating a plurality of medium types are displayed in a selectable manner. Here, application of hatching to the button illustrates that the button for selecting the medium type "PLAIN PAPER+" is being selected.

The work mode setting area 205 is the area for setting the work mode to one of the detection mode and the setting mode. Here, display of the characters "ON" illustrates that the detection mode is being selected. With the setting mode set, the characters "OFF" are displayed. While details of the work mode will be described below, a process of determining a medium type used in determining an image forming condition includes the detection mode in which the output of the detection device 159 is used and the setting mode in which the output of the detection device 159 is not used.

Here, the relationship between an image forming condition, which the MFP 100 uses to cause the image forming section 140 and the sheet feed section 150 to form an image, and a medium type will be described. Image forming conditions include a secondary transfer voltage, a fixing temperature and a sheet conveyance speed as conditions that are to be influenced by a medium type. The secondary transfer voltage is a voltage to be applied to transfer roller 47. The fixing temperature is a temperature of the fixing roller 49. The sheet conveyance speed is a speed at which a recording medium is conveyed. The sheet conveyance speed is equal to the speed at which each of the image forming units 141Y, 141M, 141C, 141K transfers a toner image to the intermediate transfer belt 147.

FIG. 8 is a diagram illustrating one example of a secondary transfer voltage table. With reference to FIG. 8, the secondary transfer voltage table defines a secondary transfer voltage for each medium type. A class indicates a group of medium types having the same secondary transfer voltage. The medium type "THIN PAPER" is classified into a class 1, the medium type "PLAIN PAPER" is classified into a class 2, the medium type "NORMAL PAPER+" is classified into a class 3, the medium types "THICK PAPER 1" and "THICK PAPER+" are classified into a class 4, and the medium types "THICK PAPER 2," "THICK PAPER 3" and "THICK PAPER 4" are classified into a class 5. In the secondary transfer voltage table illustrated in FIG. 8, although secondary transfer voltages for the medium types "THIN PAPER+," "THICK PAPER 2+," "THICK PAPER 3+" and "THICK PAPER 4+" are not defined, they can be defined as necessary.

FIG. 9 is a diagram illustrating one example of a fixing temperature table. With reference to FIG. 9, the fixing temperature table defines a fixing temperature for each medium type. A class indicates a group of medium types having the same fixing temperature. The medium type "THIN PAPER" is classified into a class 1, the medium type "PLAIN PAPER" is classified into a class 2, the medium types "PLAIN PAPER+," "THICK PAPER 1," "THICK PAPER 1+" and "THICK PAPER 2" are classified into a class 4, and the medium types "THICK PAPER 3" and "THICK PAPER 4" are classified into a class 4. In the fixing temperature table illustrated in FIG. 9, although fixing temperatures for the medium types "THIN PAPER+," "THICK PAPER 2+," "THICK PAPER 3+" and "THICK PAPER 4+" are not defined, they can be defined as necessary.

FIG. 10 is a diagram illustrating one example of a sheet conveyance speed table. With reference to FIG. 10, the sheet conveyance speed table defines a sheet conveyance speed for each medium type. A class indicates a group of medium types having the same sheet conveyance speed. The medium types "THIN PAPER," "PLAIN PAPER" and "PLAIN PAPER+" are classified into a class 1, and the medium types "THICK PAPER 1," "THICK PAPER 1+," "THICK PAPER 2," "THICK PAPER 3" and "THICK PAPER 4" are classified into a class 2. In the sheet conveyance speed table illustrated in FIG. 10, although sheet conveyance speeds for the medium types "THIN PAPER+," "THICK PAPER 2+," "THICK PAPER 3+" and "THICK PAPER 4+" are not defined, they can be defined as necessary.

The MFP 100 stores the secondary transfer voltage table, the fixing temperature table and the sheet conveyance speed table in advance in the HDD 115 in order to determine a secondary transfer voltage, a fixing temperature and a sheet conveyance speed corresponding to a medium type. In a case in which a medium type is determined, the MFP 100 determines the secondary transfer voltage, the fixing temperature and the sheet conveyance speed corresponding to the medium type with reference to the secondary transfer voltage table, the fixing temperature table and the sheet conveyance speed table. Then, the MFP 100 causes the image forming section 140 and sheet feed section 150 to form an image in accordance with the image forming conditions including the secondary transfer voltage, the fixing temperature and the sheet conveyance speed.

On the other hand, in a case in which the work mode is the detection mode in the MFP 100, a medium type is determined after part of a recording medium has passed through the detection area of the detection device 159. Therefore, in a case in which the work mode is the detection mode, the MFP 100 conveys a sheet at a predetermined detection speed in order to ensure accuracy of detection by the detection device 159. The detection speed is equal to or less than the slowest sheet conveyance speed among a plurality of sheet conveyance speeds respectively defined for a plurality of medium types. Here, the sheet conveying speed is equal to or less than the sheet conveying speed 165 mm/s defined for the medium type "THIN PAPER." Image forming conditions other than the sheet conveyance speed are determined after a medium type is determined based on the output of the detection device 159, and an image is formed in accordance with the image forming conditions. In a case in which images are successively formed on a plurality of recording media, because a medium type is determined before the second recording medium or the second and subsequent recording media are conveyed, the second recording medium or the second and subsequent recording media are conveyed at the sheet conveyance speed corresponding to a medium type.

Referring back to FIG. 5, the setter 57 sets a setting value for formation of an image on the recording medium S by the image forming section 140. The setter 57 includes a mode setter 61, a medium setter 63, a resetter 65, a restrictor 67 and a flag setter 69.

In a case in which an operation of setting a medium type is accepted by the operation acceptor 53, the medium setter 63 sets the medium type designated by the user in correspondence with the tray designated by the user from among the sheet feed trays 151 to 153 and the manual sheet feed tray 154. For example, a tray table including a tray record in which a medium type, a work mode and a restriction flag are associated with tray identification information for identifying a sheet feed tray is stored the HDD 115. Further, the tray table is updated in response to acceptance of an operation of setting a medium type by the operation acceptor 53. The medium type of the tray record including the tray identification information of a tray designated by the user is updated to the medium type corresponding to an operation accepted by the operation acceptor 53.

In a case where an operation of setting a work mode is accepted by the operation acceptor 53, the mode setter 61 sets the work mode designated by the user in correspondence with a tray designated by the user from among the sheet feed trays 151 to 153 and the manual sheet feed tray 154. For example, the mode setter 61 updates a tray table stored in the HDD 115 in response to acceptance of an operation of setting a work mode by the operation acceptor 53. The work mode of the tray record including the tray identification information of a tray designated by the user is updated to the work mode specified by the operation accepted by the operation acceptor 53.

The flag setter 55 sets a restriction flag for a tray having the medium type that is set by the medium setter 63 among the sheet feed trays 151 to 153 and the manual sheet feed tray 154. The flag setter 55 updates a tray table stored in the HDD 115 in response to setting of the medium type by the medium setter 63. The restriction flag of a tray record including the tray identification information of a tray having a specific medium type that has been set by the medium setter 63 is set to ON, and the restriction flag of a tray record including the tray identification information of a tray having a non-specific medium type that has been set by the medium setter 63 is set to OFF.

In a case in which a predetermined condition is satisfied, the resetter 65 resets at least part of a plurality of setting values used for formation of an image on a recording medium by the image forming section 140. In regard to each of a plurality of setting values used for formation of an image on a recording medium by the image forming section 140, a default value is defied in advance. The resetter 65 sets at least part of the plurality of setting values to a default value.

Predetermined conditions include a first condition that a first predetermined period of time elapses since the last reset by the resetter 65 and a second condition that a second predetermined period of time elapses from the last acceptance of a user operation. The first predetermined period of time and the second predetermined period of time may be the same or different. In a case in which one of the first condition and the second condition is satisfied, the predetermined condition is satisfied. Further, a predetermined condition may be detection of a predetermined operation input to the operation part 163 by the user. The default value of a setting value for a medium type is a setting value "UNKNOWN" which indicates that the medium type of a recording medium is unknown. The default value for the work mode is a setting value indicating the detection mode.

In regard to a tray for which the restriction flag is set to ON by the flag setter 69, the restrictor 67 prohibits a reset process executed by the resetter 65. The tray table includes the plurality of setting values, including a sheet size, a medium type, a work mode and a restriction flag, respectively corresponding to each of the sheet feed trays 151 to 153 and the manual sheet feed tray 154. The resetter 65 resets the sheet size, the medium type and the work mode with respect to a tray for which the reset process is not prohibited by the restrictor 67 among the sheet feed trays 151 to 153 and the manual sheet feed tray 154. On the other hand, the resetter 65 does not reset the sheet size, the medium type or the work mode in regard to a tray for which the reset process is prohibited by the restrictor 67.

Figure 11:
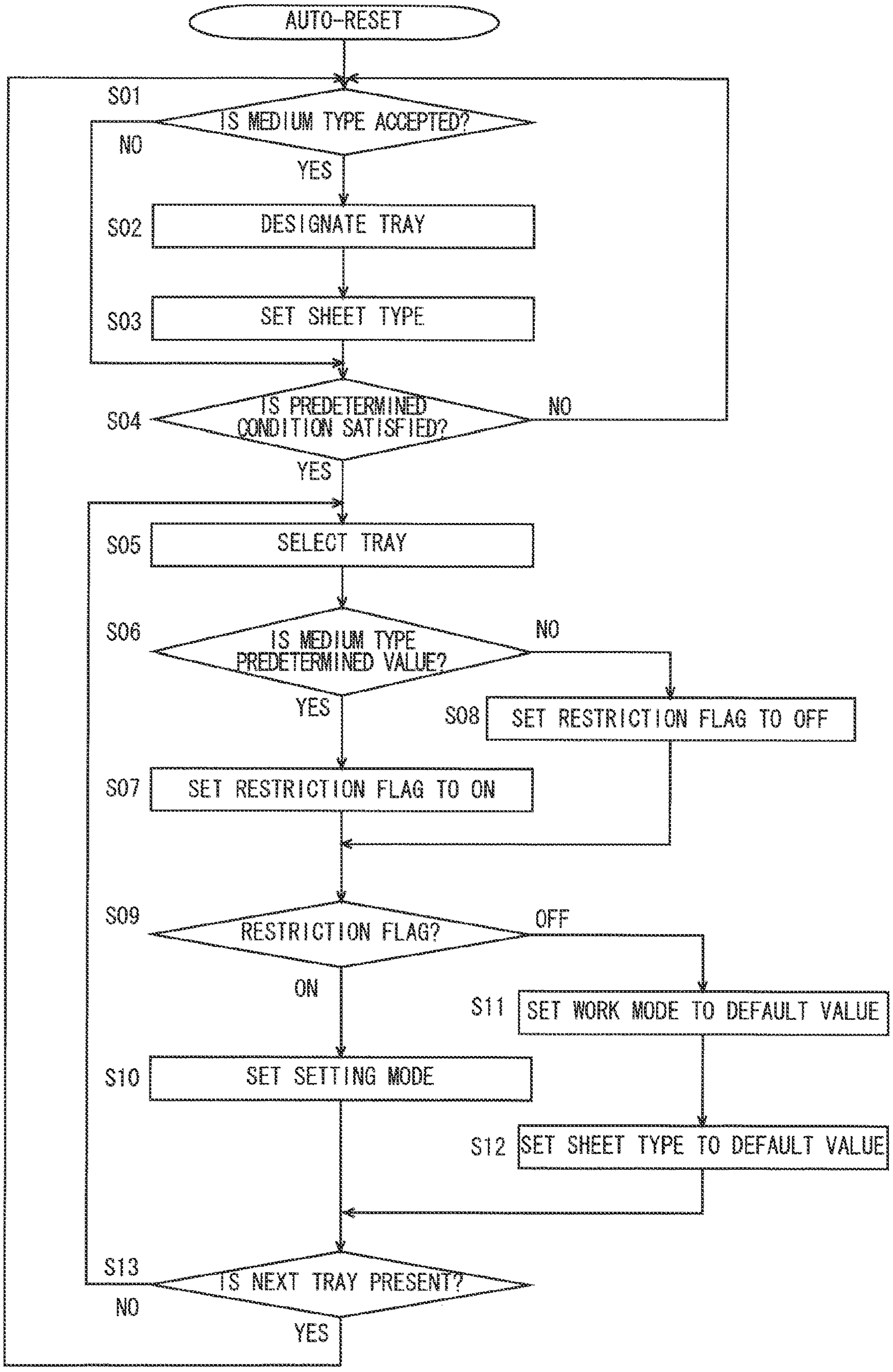
FIG. 11 is a flowchart illustrating one example of a flow of an auto-reset process.

FIG. 11 is a flowchart illustrating one example of a flow of an auto-reset process. The auto-reset process is a process that is executed by the CPU 111 when the CPU 111 of the MFP 100 executes an image forming apparatus reset program stored in the ROM 113, the HDD 115 or the CD-ROM 118A.

With reference to FIG. 11, the CPU 111 included in the MFP 100 determines whether a medium type has been accepted (step S01). If the medium type has been accepted, the process proceeds to the step S02. If not, the process proceeds to the step S04. The CPU 111 displays the sheet feed tray setting screen on the display part 161 and accepts an operation of designating a medium type in a case in which an operation of designating one of the sheet feed trays 151 to 153 and the manual sheet feed tray 154 and an operation of designating a medium type are input to the operation part 163.

The tray corresponding to the medium type accepted in the step S01 is specified in the step S02, and the process proceeds to the step S03. The tray designated by the user from among the sheet feed trays 151 to 153 and the manual sheet feed tray 154 is specified in the sheet feed tray setting screen.

In the step S03, the medium type accepted in the step S01 is set for the tray specified in the step S02, and the process proceeds to the step S04. Specifically, the setting value indicating the medium type accepted in the step S01 is set with respect to the medium type of the tray record including the tray identification information of the tray specified in the step S02 among the plurality of tray records included in the tray table stored in the HDD 115.

In the step S04, whether a predetermined condition is satisfied is determined. If the predetermined condition is satisfied, the process proceeds to the step S05. If not, the process returns to the step S01. Predetermined conditions include a first condition that a first predetermined period of time elapses since last execution of the process illustrated in the steps S07 to the step S10, described below, and a second condition that a second predetermined period of time elapses since a user operation is last accepted. The first predetermined period of time and the second predetermined period of time may be the same or different.

In the step S05, a tray subject to a process is selected from among the sheet feed trays 151 to 153 and the manual sheet feed tray 154, and the process proceeds to the step S06. In the step S06, whether the medium type is a predetermined value is determined. Reference is made to the medium type that is set in the tray record including the tray identification information of the tray selected as being subject to a process in the step S05 among a plurality of tray records included in the tray table stored in the HDD 115. If the medium type is a predetermined value, the process proceeds to the step S07. If not, the process proceeds to the step S08. The predetermined value is a value determined in advance as a medium type in a case in which the accuracy of determination of a medium type based on an output value of the detection device 159 is equal to or less than predetermined accuracy. In the present embodiment, the predetermined value is the medium type indicating "PRINTED PAPER" for the second medium type, and "PLAIN PAPER+" or "THICK PAPER+" is set.

In the step S07, the restriction flag is set to ON, and the process proceeds to the step S08. The restriction flag set in the tray record including the tray identification information of the tray selected as being subject to a process in the step S05 from among the plurality of tray records included in the tray table stored in the HDD 115 is rewritten to ON.

In the step S08, the restriction flag is set to OFF, and the process proceeds to the step S09. The restriction flag set in the tray record including the tray identification information of the tray selected as being subject to a process in the step S05 among the plurality of tray records included in the tray table stored in the HDD 115 is rewritten to OFF.

In the step S09, the process branches according to the restriction flag. If the restriction flag is set to ON, the process proceeds to the step S10. If not, the process proceeds to the step S11. In the step S10, the work mode is set to the setting mode, and the process proceeds to the step S13. The work mode set in the tray record including the tray identification information of the tray selected as being subject to a process in the step S05 among the plurality of tray records included in the tray table stored in the HDD 115 is set to the setting mode.

The work mode is set to the setting mode in a case in which the restriction flag is set to ON. Therefore, in a case in which the setting value for the medium type is set to the predetermined value, when a recording medium passes through the detection area of the detection device 159, the setting value for the medium type is not updated with the medium type that is determined based on the output of the detection device 159. Therefore, when an image is formed on the recording medium next time, it is possible to form an image on the recording medium in accordance with the image forming condition corresponding to the predetermined value that is set as the setting value for the medium type.

Further, in a case in which the restriction flag is set to ON, the setting value for the medium type is not changed to a default value. Therefore, in a case in which the printed paper which is the second medium type is set as the setting value for the medium type, the medium type is not changed to "UNKNOWN" which is the default value. Therefore, when an image is formed on the recording medium, it is possible to form an image on the recording medium in accordance with the image forming condition corresponding to the printed paper which is the second medium type for the medium type.

In the step S11, the work mode is set to the default value, and the process proceeds to the step S10. The work mode set in the tray record including the tray identification information of the tray selected as being subject to a process the step S05 among the plurality of tray records included in the tray table stored in the HDD 115 is set to the detection mode which is the default value.

In the step S12, the medium type is set to the default value, and the process proceeds to the step S13. The medium type set in the tray record including the tray identification information of the tray selected as being subject to a process in the step S05 among the plurality of tray records included in the tray table stored in the HDD 115 is set to the default value indicating that the medium type is unknown.

Note that the step S11 and the step S12 are not performed during the image forming work performed by the MFP 100. In a case in which the MFP 100 is performing the image forming work at a point in time at which the process proceeds to the step S11, the step S11 and the step S12 are performed after the image forming work ends. Further, in regard to the process of the steps S11 and S12, the step S11 may be performed first, or the step S12 may be performed first.

In the step S13, whether a tray that is not selected as being subject to a process in the step S05 is present among the sheet feed trays 151 to 153 and the manual sheet feed tray 154 is determined. If an unselected tray is present, the process returns to the step S05. If not, the process returns to the step S01.

Figure 12:
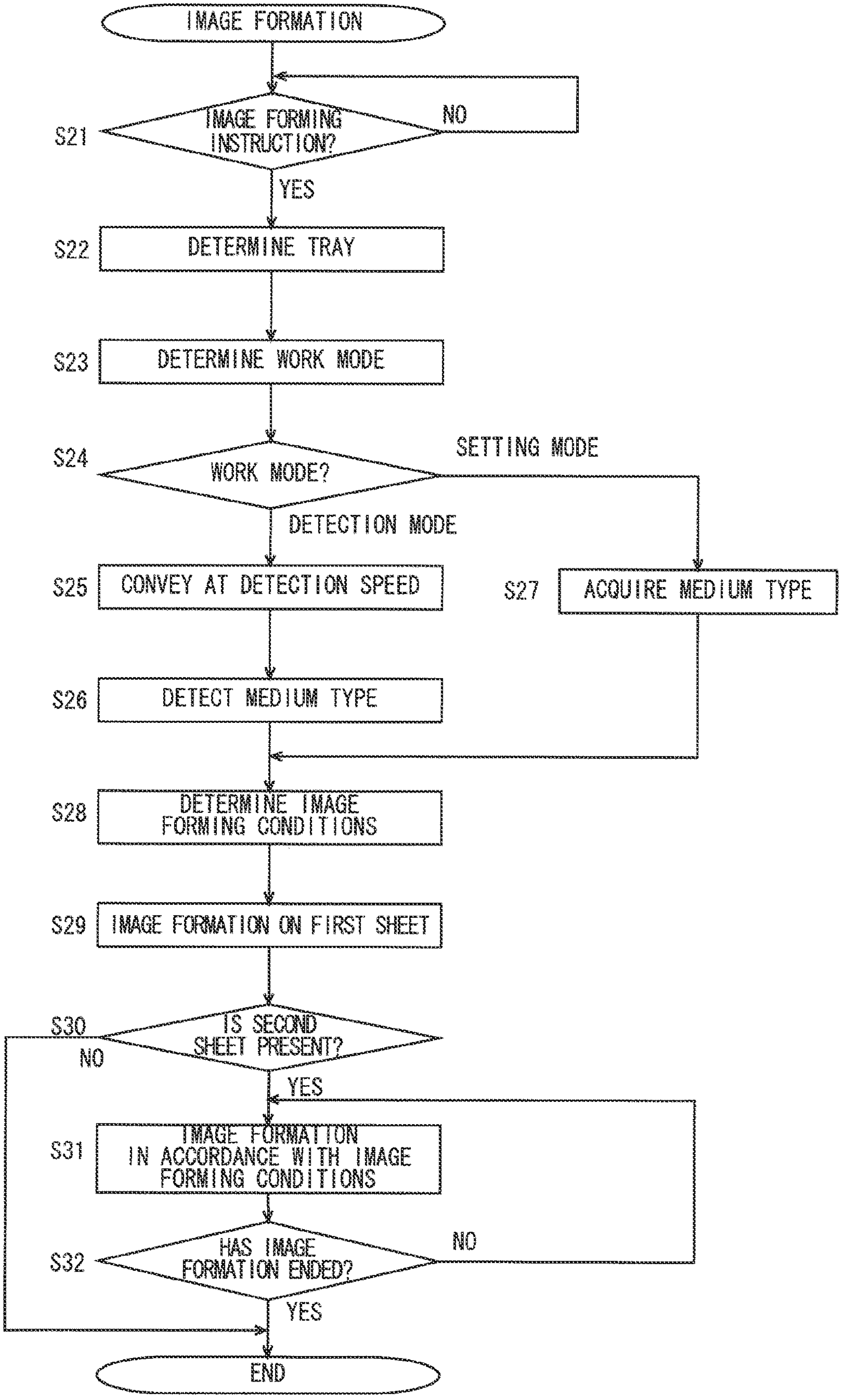
FIG. 12 is a flowchart illustrating one example of a flow of an image formation process.

FIG. 12 is a flowchart illustrating one example of a flow of an image formation process. The image formation process is a process executed by the CPU 111 of the MFP 100 when the CPU 111 executes the image forming control program stored in the ROM 113, the HDD 115 or the CD-ROM 118A. With reference to FIG. 12, the CPU 111 included in the MFP 100 determines whether an image forming instruction has been accepted (step S21). In a case in which the user performs an operation of providing an image forming instruction such as an operation of pressing a start button to the operation part 163, the image forming instruction is accepted. The process waits until the mage forming instruction is accepted (NO in the step S21). If the image forming instruction is accepted (YES in the step S21), the process proceeds to the step S22.

In the step S22, a tray is determined, and the process proceeds to the step S23. As one of image forming conditions, a tray designated by the user from among the sheet feed trays 151 to 153 and the manual sheet feed tray 154 is determined. In a case in which the user designates a sheet size, the tray that stores a recording medium of the sheet size designated by the user from among the sheet feed trays 151 to 153 and the manual sheet feed tray 154 may be determined. In the step S23, the work mode is determined, and the process proceeds to the step S24. The work mode set in the tray record including the tray identification information of the tray determined in the step S22 among the plurality of tray records included in the tray table stored in the HDD 115 is determined.

In the step S24, the CPU 111 branches the process according to the work mode determined in the step S23. If the work mode is the detection mode, the process proceeds to the step S25. If the work mode is the setting mode, the process proceeds to the step S27.

In the step S25, the sheet stored in the tray determined in the step S22 is conveyed at the detection speed, and the process proceeds to the step S26. The detection speed is a speed at which the sheet is to be conveyed, and is a predetermined speed as a sheet conveyance speed at which the detection device 159 detects the type of the sheet. In the step S26, the medium type is determined based on the output from the detection device 159, and the process proceeds to the step S28.

In the step S27, the medium type is acquired, and the process proceeds to the step S28. The medium type set in the tray record including the tray identification information of the tray determined in the step S22 among the plurality of tray records included in the tray table stored in the HDD 115 is determined.

In the step S28, image forming conditions are determined, and the process proceeds to the step S29. In a case in which the process proceeds from the step S26, except for a sheet conveyance speed at which a recording medium is to be conveyed among the image forming conditions, the image forming conditions corresponding to the medium type detected in the step S26 are determined. The detection speed at which a recording medium is to be conveyed in the step S25 is set as the sheet conveyance speed. On the other hand, in a case in which the process proceeds from the step S27, the image forming conditions corresponding to the medium type acquired in the step S27 are determined. The image forming conditions determined based on the medium type include a secondary transfer voltage, a fixing temperature and a sheet conveyance speed.

In the step S29, an image is formed on the first recording medium in accordance with the image forming conditions determined in the step S28, and the process proceeds to the step S30. In the step S30, whether the second recording medium or the second and subsequent recording media on which images are to be formed are present is determined. If the second recording medium or the second and subsequent recording media are present, the process proceeds to the step S31. If not, the process ends.

In the step S31, images are formed on the second recording medium or the second and subsequent recording media in accordance with the image forming conditions corresponding to the medium type of the recording medium, and the process proceeds to the step S32. In the step S32, whether image formation has ended is determined. When the images have been formed on all of the recording media on which images are to be formed, it is determined that image formation has ended. If the image formation has ended, the process ends. If not, the process returns to the step S31.

<Examples>

A specific example of a reset process will be described. FIG. 13 is a diagram illustrating one example of setting values before and after the reset process is executed. Here, in regard to each of the tray identification information pieces "TRAY 1," "TRAY 2" and "TRAY 3" of the sheet feed trays 151 to 153, the medium types and the work modes that are set before and after the execution of the reset process are illustrated.

In regard to the sheet feed tray 151 having the tray identification information piece "TRAY 1," at the stage before the reset work is performed, the medium type "PLAIN PAPER" is set, and "DETECTION MODE" is set as the work mode. After the reset process is executed in this state, the setting value "UNKNOWN," which is a default value and indicates that the type of a recording medium is unknown, is set as the medium type, and "DETECTION MODE" which is a default value is set as the work mode.

In regard to the sheet feed tray 152 having the tray identification information piece "TRAY 2," at the stage before the reset work is performed, the medium type "PLAIN PAPER+" is set, and "SETTING MODE" is set as the work mode. After the reset process is executed in this state, the medium type "PLAIN PAPER+" is set, and "SETTING MODE" is set as the work mode. Because the medium type "PLAIN PAPER+" indicating a printed paper is set for the sheet feed tray 152, the medium type is not changed to the default value. In regard to a recording medium the second medium type of which is a printed paper, the accuracy of detection of the medium type that is determined based on the output of the detection device 159 is low. Therefore, in a case in which the medium type "PLAIN PAPER+" indicating that the second medium type is "PRINTED PAPER" is set as a setting value for the medium type of a recording medium, the medium type is not changed to "UNKNOWN" which is the default value. Therefore, it is possible to form an image on the recording medium in accordance with the image forming conditions corresponding to the medium type "PLAIN PAPER+."

Further, because the medium type "PLAIN PAPER+" indicating that the second medium type is "PRINTED PAPER" is set for the sheet feed tray 152, the work mode is not changed to the default value. Therefore, when a recording medium having the medium type "PLAIN PAPER+" indicating that the second medium type is "PRINTED PAPER" passes through the detection area of the detection device 159, the medium type "PLAIN PAPER+" is not updated to the medium type that is determined based on the output from the detection device 159. Therefore, when an image is formed next time, it is possible to form an image on the recording medium in accordance with the image forming conditions corresponding to the medium type "PLAIN PAPER+."

In the sheet feed tray 153 having the tray identification information piece "TRAY 3," at the stage before the reset work is performed, the medium type "THICK PAPER 1" is set, and "SETTING MODE" is set as the work mode. After the reset process is executed in this state, the setting value "UNKNOWN," which is a default value and indicates that the type of a recording medium is unknown, is set as the medium type, and "DETECTION MODE" which is a default value is set as the work mode.

<Modification Examples>

In regard to detection of the medium type of a recording medium in the present embodiment, a physical property value which is a transmittance at which the recording medium transmits light is detected, and the medium type corresponding to the physical property value is specified. However, the present invention is not limited to this. In addition, a light reflectance, rigidity, a thickness, a basis weight, a size, a grain direction, a color, a moisture content rate, smoothness, an electrical resistance, a friction coefficient, and constituent elements of a recording medium can be used as physical property values. The constituent elements include a pulp material, a coating agent, a fluorescent agent and a filler.

Further, a medium type may be determined based on a transmittance TR that is output from the detection device 149 without use of the correspondence table. In this case, the table in which transmittances TR and medium types are associated with each other is used. Further, image forming conditions (a conveyance speed, a transfer voltage and a fixing temperature) may be determined directly based on physical property values such as a transmittance TR acquired based on a recording medium.

While the tray table in the present embodiment includes a tray record in which a medium type, a work mode and a restriction flag are associated with tray identification information by way of example, it is not necessary to use the tray table. A medium type, a work mode and a restriction flag are only required to be associated with each of the sheet feed trays 151 to 153 and the manual sheet feed tray 154. For example, tables respectively corresponding to a medium type, a work mode and a restriction flag may be used. Further, a restriction flag does not necessarily have to be used. In a case in which a predetermined value is set for a medium type, a work mode and a medium type are only required to be prevented from being reset to default values.

<Overview of Embodiment>

(Item 1) An image forming apparatus includes an image former that forms an image on a recording medium in accordance with an image forming condition corresponding to a medium type of the recording medium, and a hardware processor, wherein the hardware processor includes a detector that detects information in regard to a medium type of a recording medium as first information, a type acquirer that accepts information in regard to a medium type of a recording medium as second information, a resetter that performs a reset work of setting at least one setting value that defines the image forming condition to a default value in response to satisfaction of a predetermined condition, and a restrictor that, even when the reset work is performed by the resetter, controls the image forming apparatus to prevent second information in regard to a predetermined recording medium accepted by the type acquirer from being reset.

According to this aspect, the second information accepted in regard to the recording medium is prevented from being reset, even when the reset work is performed. In a case in which a predetermined recording medium detected as first information has low accuracy of detection for the medium type, it is possible to form an image in accordance with image forming conditions suitable for the recording medium accepted as the second information. Therefore, it is possible to provide an image forming apparatus that can form an image in accordance with image forming conditions corresponding to the medium type of a recording medium.

(Item 2) The image forming apparatus according to item 1, wherein the restrictor prevents the reset work from being performed in a case in which the second information is accepted as a setting value for the medium type and a predetermined medium type is set.

According to this aspect, the reset work is not performed in a case in which second information is accepted as a setting value for a medium type, and a predetermined medium type is set. In a case in which the medium type of a recording medium having low accuracy of detection of the medium type of the recording medium as first information is a predetermined medium type, an image is formed in accordance with the image forming conditions suitable for the recording medium having the predetermined medium type. Therefore, it is possible to provide an image forming apparatus that can form an image in accordance with the image forming conditions corresponding to the medium type of the recording medium.

(Item 3) The image forming apparatus according to item 2, wherein the hardware processor further includes a mode setter that sets a work mode indicating one of a first work mode in which the image forming condition is determined with use of the first information and a second work mode in which the image forming condition is determined with use of the second information, a default value of a setting value for the work mode is a setting value indicating the first work mode, and the restrictor, in a case in which the second work mode is set as a setting value for the work mode, the second information is accepted as a setting value for the medium type, and the predetermined medium type is set, prevents the reset work from being performed with respect to a setting value for the work mode.

According to this aspect, in a case in which the second work mode is set as a setting value for a work mode, second information is set as a setting value for a medium type, and the predetermined medium type is set, the reset work for the work mode is not performed. Therefore, in a case in which the predetermined medium type is set as the medium type of a recording medium, image forming conditions are determined with use of second information, and the image forming conditions are not determined with use of first information. Thus, the medium type of the recording medium is not updated based on the first information. Therefore, it is possible to prevent a medium type, being detected as first information, of a recording medium having low accuracy of detection of the medium type of the recording medium from being updated based on the first information.

(Item 4) The image forming apparatus according to item 2 or 3, further includes a tray that stores a recording medium, wherein the hardware processor further includes a medium setter that sets a medium type of the recording medium stored in the tray, a default value of a setting value for the medium type is a setting value indicating that a medium type is unknown, and the restrictor, in a case in which the second information is accepted as a setting value for the medium type and the predetermined type is set, prevents the reset work from being performed with respect to a setting value for the medium type.

According to this aspect, in a case in which second information is accepted as a setting value for a medium type, and a predetermined medium type is set, the reset work is not performed with respect to a setting value for a medium type. Therefore, in a case in which the predetermined medium type is set as the medium type of a recording medium, the medium type of the recording medium is not reset to the default value. Therefore, a medium type, which is detected as first information, of a recording medium having low accuracy of detection of the medium type of the recording medium can be prevented from being changed to a default value.

(Item 5) The image forming apparatus according to any one of items 2 to 4, further includes a tray that stores a recording medium, wherein the hardware processor further includes a mode setter that sets a mode setting value indicating a work mode indicating one of a first work mode in which the image forming condition is determined with use of the first information and a second work mode in which the image forming condition is determined with use of the second information, and a medium setter that sets a setting value indicating a medium type of a recording medium stored in the tray, a default value of a setting value for the work mode is a setting value indicating the first work mode, and a default value of a setting value for a medium type is a setting value indicating that a medium type is unknown, and the restrictor, in a case in which the second information is accepted as a setting value for the medium type and the predetermined medium type is set, prevents the reset work from being performed with respect to a setting value for the work mode and a setting value for the medium type.

According to this aspect, in a case in which a predetermined medium type is set as the medium type of a recording medium, image forming conditions are determined with use of second information, and the image forming conditions are not determined with use of first information. Therefore, the medium type of the recording medium is not updated based on first information. Further, in a case in which a predetermined medium type is set as the medium type of a recording medium, the medium type of the recording medium is not reset to a default value. Therefore, a medium type, which is detected as first information, of a recording medium having low accuracy of detection of the medium type of the recording medium can be prevented from being changed to first information and a default value.

(Item 6) The image forming apparatus according to any one of items 2 to 5, wherein the hardware processor further includes a flag setter that sets a restriction flag in a case in which the second information is accepted as a setting value for the medium type and the predetermined medium type is set, and the restrictor prevents the reset work from being performed in a case in which the restriction flag is set and allows the reset work to be performed in a case in which the restriction flag is not set.

According to this aspect, a restriction flag is set in a case in which second information is accepted as a setting value for a medium type, and a predetermined medium type is set. Further, the reset work is not performed in a case in which a restriction flag is set. The reset work is performed in a case in which a restriction flag is not set. Therefore, it is possible to easily determine whether the reset work is to be performed.

(Item 7) The image forming apparatus according to item 2, further includes a plurality of trays that store recording media, wherein the hardware processor further includes a mode setter that sets a work mode for each of the plurality of trays, the work mode indicating one of a first work mode in which the image forming condition is determined with use of the first information and a second work mode in which the image forming condition is determined with use of the second information, a default value of a setting value for the work mode is a setting value indicating the first work mode, the resetter sets a setting value for the work mode to a default value for each of the plurality of trays, and the restrictor prevents the reset work from being performed with respect to a setting value for the work mode, the setting value corresponding to a specific tray for which the second information is accepted as a setting value for the medium type and the predetermined medium type is set.

According to this aspect, the work mode corresponding to a specific tray storing a recording medium of a predetermined medium type as the medium type of the recording medium among a plurality of trays is not reset to a default value. Therefore, it is possible to prevent the medium type of the recording medium stored in the specific tray from being updated based on first information.

(Item 8) The image forming apparatus according to item 2 or 7, further includes a plurality of trays that store recording media, wherein the hardware processor further includes a medium setter that sets a medium type of a recording medium stored in each of the plurality of trays, a default value of a setting value for the medium type is a setting value indicating that a medium type is unknown, and the restrictor prevents the reset work from being performed with respect to a setting value for the medium type, the setting value corresponding to a specific tray for which the second information is accepted as a setting value for the medium type and the predetermined medium type is set among the plurality of trays.

According to this aspect, a medium type corresponding to a specific tray storing a recording medium of a predetermined medium type as the medium type of the recording medium among a plurality of trays can be prevented from being changed to a default value.

(Item 9) The image forming apparatus according to any one of items 2, 7 and 8, further includes a plurality of trays that store recording media, wherein the hardware processor further includes a mode setter that sets a work mode for each of the plurality of trays, the work mode indicating one of a first work mode in which the image forming condition is determined with use of the first information and a second work mode in which the image forming condition is determined with use of the second information, and a medium setter that sets a medium type of a recording medium stored in each of the plurality of trays, a default value of a setting value for the work mode is a setting value indicating the first work mode, a default value of a setting value for the medium type is a setting value indicating that a medium type is unknown, and the restrictor prevents the reset work from being performed with respect to a setting value for the work mode and a setting value for the medium type, the setting values corresponding to a specific tray for which the second information is accepted as a setting value for the medium type and the predetermined medium type is set among the plurality of trays.

According to this aspect, a work mode and a medium type corresponding to a specific tray storing a recording medium of a predetermined medium type as the medium type of the recording medium among a plurality of trays are not reset to default values. Therefore, it is possible to prevent the medium type of the recording medium stored in the specific tray from being changed to first information or a default value.

(Item 10) The image forming apparatus according to any one of items 2 and items 7 to 9, further includes a plurality of trays that store recording media, wherein the hardware processor further includes a flag setter that sets a restriction flag in a case in which the second information is accepted as a setting value for the medium type and the predetermined medium type is set in correspondence with each of the plurality of trays, and the restrictor prevents the reset work from being performed with respect to a restriction tray for which the restriction flag is set among the plurality of trays, and allows the reset work to be performed with respect to a non-restriction tray for which the restriction flag is not set among the plurality of trays.

According to this aspect, the reset work is not performed with respect to a restriction tray for which a restriction flag is set among a plurality of trays, and the reset work is performed with respect to a non-restriction tray for which a restriction flag is not set among the plurality of trays. Therefore, it is possible to easily determine whether the reset work is to be performed for each of the plurality of trays.

(Item 11) The image forming apparatus according to any one of items 1 to 10, wherein the predetermined condition on which the resetter starts the reset work includes a condition in regard to an elapsed period of time since the reset work is last performed and a condition in regard to an elapsed period of time since an operation input by a user is last accepted.

(Item 12) The image forming apparatus according to any one of items 1 to 11, wherein the resetter, in a case in which an image is formed by the image former at a point in time at which the predetermined condition is satisfied, starts the reset work after an image forming work performed by the image former ends.

According to this aspect, because a setting value is not changed during the image forming work, it is possible to normally perform the image forming work.

(Item 13) The image forming apparatus according to any one of items 1 to 12, further includes an optical sensor having a light emitter and a light receiver, wherein the detector detects the first information based on an output value of the optical sensor.

(Item 14) The image forming apparatus according to any one of items 1 to 13, wherein the first information and the second information are one of a physical property value or a type of a recording medium determined based on the physical property value, the physical property value includes a light transmittance, a light reflectance, rigidity, a thickness, a basis weight, a size, a grain direction, a color, a moisture content rate, smoothness, an electrical resistance, a friction coefficient and information representing a constituent element, and the information representing a constituent element includes a pulp material, a coating agent, a fluorescent agent and a filler.

(Item 15) An image forming apparatus reset method causes an image forming apparatus to perform an image forming step of forming an image on a recording medium in accordance with an image forming condition corresponding to a medium type of the recording medium, a detecting step of detecting information in regard to a medium type of a recording medium as first information, a type acquiring step of accepting information in regard to a medium type of a recording medium as second information, a resetting step of performing a reset work of setting at least one setting value that defines the image forming condition to a default value in response to satisfaction of a predetermined condition, and a restricting step of, even when a reset work is performed in the resetting step, controlling the image forming apparatus to prevent second information in regard to a predetermined recording medium accepted in the type acquiring step from being reset.

According to this aspect, it is possible to provide an image forming apparatus reset method with which it is possible to cause the image forming apparatus to form an image in accordance with image forming conditions corresponding to the medium type of a recording medium.

(Item 16) A non-transitory computer-readable recording medium encoded with an image forming apparatus reset program causes a computer controlling an image forming apparatus to perform an image forming step of forming an image on a recording medium in accordance with an image forming condition corresponding to a medium type of the recording medium, a detecting step of detecting information in regard to a medium type of a recording medium as first information, a type acquiring step of accepting information in regard to a medium type of a recording medium as second information, a resetting step of performing a reset work of setting at least one setting value that defines the image forming condition to a default value in response to satisfaction of a predetermined condition, and a restricting step of, even when a reset work is performed in the reset step, controlling the image forming apparatus to prevent second information in regard to a predetermined recording medium accepted in the type acquiring step from being reset.

According to this aspect, it is possible to provide a non-transitory computer-readable recording medium encoded with an image forming apparatus reset program that can cause the image forming apparatus to form an image in accordance with image forming conditions corresponding to the medium type of a recording medium.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image forming apparatus comprising:

an image former that forms an image on a recording medium in accordance with an image forming condition corresponding to a medium type of the recording medium; and a hardware processor, wherein the hardware processor detects information in regard to a medium type of a recording medium as first information;

accepts information in regard to a medium type of a recording medium as second information;

performs a reset work of setting at least one setting value that defines the image forming condition to a default value in response to satisfaction of a predetermined condition; and even when the reset work is performed, controls the image former to prevent accepted second information in regard to a predetermined recording medium from being reset.

2. The image forming apparatus according to claim 1, wherein the hardware processor prevents the reset work from being performed in a case in which the second information is accepted as a setting value for the medium type and a predetermined medium type is set.

3. The image forming apparatus according to claim 2, wherein the hardware processor further sets a work mode indicating one of a first work mode in which the image forming condition is determined with use of the first information and a second work mode in which the image forming condition is determined with use of the second information, a default value of a setting value for the work mode is a setting value indicating the first work mode, and the hardware processor, in a case in which the second work mode is set as a setting value for the work mode, the second information is accepted as a setting value for the medium type, and the predetermined medium type is set, prevents the reset work from being performed with respect to a setting value for the work mode.

4. The image forming apparatus according to claim 2, further comprising a tray that stores a recording medium, wherein the hardware processor further sets a medium type of the recording medium stored in the tray, a default value of a setting value for the medium type is a setting value indicating that a medium type is unknown, and the hardware processor, in a case in which the second information is accepted as a setting value for the medium type and the predetermined type is set, prevents the reset work from being performed with respect to a setting value for the medium type.

5. The image forming apparatus according to claim 2, further comprising a tray that stores a recording medium, wherein the hardware processor further sets a mode setting value indicating a work mode indicating one of a first work mode in which the image forming condition is determined with use of the first information and a second work mode in which the image forming condition is determined with use of the second information, and sets a setting value indicating a medium type of a recording medium stored in the tray, a default value of a setting value for the work mode is a setting value indicating the first work mode, and a default value of a setting value for a medium type is a setting value indicating that a medium type is unknown, and the hardware processor, in a case in which the second information is accepted as a setting value for the medium type and the predetermined medium type is set, prevents the reset work from being performed with respect to a setting value for the work mode and a setting value for the medium type.

6. The image forming apparatus according to claim 2, wherein the hardware processor further sets a restriction flag in a case in which the second information is accepted as a setting value for the medium type and the predetermined medium type is set, and prevents the reset work from being performed in a case in which the restriction flag is set and allows the reset work to be performed in a case in which the restriction flag is not set.

7. The image forming apparatus according to claim 2, further comprising a plurality of trays that store recording media, wherein the hardware processor further sets a work mode for each of the plurality of trays, the work mode indicating one of a first work mode in which the image forming condition is determined with use of the first information and a second work mode in which the image forming condition is determined with use of the second information, a default value of a setting value for the work mode is a setting value indicating the first work mode, the hardware processor sets a setting value for the work mode to a default value for each of the plurality of trays, and prevents the reset work from being performed with respect to a setting value for the work mode, the setting value corresponding to a specific tray for which the second information is accepted as a setting value for the medium type and the predetermined medium type is set.

8. The image forming apparatus according to claim 2, further comprising a plurality of trays that store recording media, wherein the hardware processor further sets a medium type of a recording medium stored in each of the plurality of trays, a default value of a setting value for the medium type is a setting value indicating that a medium type is unknown, and the hardware processor prevents the reset work from being performed with respect to a setting value for the medium type, the setting value corresponding to a specific tray for which the second information is accepted as a setting value for the medium type and the predetermined medium type is set among the plurality of trays.

9. The image forming apparatus according to claim 2, further comprising a plurality of trays that store recording media, wherein the hardware processor further sets a work mode for each of the plurality of trays, the work mode indicating one of a first work mode in which the image forming condition is determined with use of the first information and a second work mode in which the image forming condition is determined with use of the second information, and sets a medium type of a recording medium stored in each of the plurality of trays, a default value of a setting value for the work mode is a setting value indicating the first work mode, a default value of a setting value for the medium type is a setting value indicating that a medium type is unknown, and the hardware processor prevents the reset work from being performed with respect to a setting value for the work mode and a setting value for the medium type, the setting values corresponding to a specific tray for which the second information is accepted as a setting value for the medium type and the predetermined medium type is set among the plurality of trays.

10. The image forming apparatus according to claim 2, further comprising a plurality of trays that store recording media, wherein the hardware processor further sets a restriction flag in a case in which the second information is accepted as a setting value for the medium type and the predetermined medium type is set in correspondence with each of the plurality of trays, and prevents the reset work from being performed with respect to a restriction tray for which the restriction flag is set among the plurality of trays, and allows the reset work to be performed with respect to a non-restriction tray for which the restriction flag is not set among the plurality of trays.

11. The image forming apparatus according to claim 1, wherein the predetermined condition on which the hardware processor starts the reset work includes a condition in regard to an elapsed period of time since the reset work is last performed and a condition in regard to an elapsed period of time since an operation input by a user is last accepted.

12. The image forming apparatus according to claim 1, wherein the hardware processor, in a case in which an image is formed by the image former at a point in time at which the predetermined condition is satisfied, starts the reset work after an image forming work performed by the image former ends.

13. The image forming apparatus according to claim 1, further comprising an optical sensor having a light emitter and a light receiver, wherein the hardware processor detects the first information based on an output value of the optical sensor.

14. The image forming apparatus according to claim 1, wherein the first information and the second information are one of a physical property value or a type of a recording medium determined based on the physical property value, the physical property value includes a light transmittance, a light reflectance, rigidity, a thickness, a basis weight, a size, a grain direction, a color, a moisture content rate, smoothness, an electrical resistance, a friction coefficient and information representing a constituent element, and the information representing a constituent element includes a pulp material, a coating agent, a fluorescent agent and a filler.

15. An image forming apparatus reset method of causing an image forming apparatus to perform:

an image forming step of forming an image on a recording medium in accordance with an image forming condition corresponding to a medium type of the recording medium;

a detecting step of detecting information in regard to a medium type of a recording medium as first information;

a type acquiring step of accepting information in regard to a medium type of a recording medium as second information;

a resetting step of performing a reset work of setting at least one setting value that defines the image forming condition to a default value in response to satisfaction of a predetermined condition; and a restricting step of, even when a reset work is performed in the resetting step, controlling the image forming apparatus to prevent second information in regard to a predetermined recording medium accepted in the type acquiring step from being reset.

16. The image forming apparatus reset method according to claim 15, wherein the restricting step includes preventing the reset work from being performed in a case in which the second information is accepted as a setting value for the medium type and a predetermined medium type is set.

17. The image forming apparatus reset method according to claim 15, wherein the predetermined condition on which the reset work is started in the resetting step includes a condition in regard to an elapsed period of time since the reset work is last performed and a condition in regard to an elapsed period of time since an operation input by a user is last accepted.

18. The image forming apparatus reset method according to claim 15, wherein the resetting step, in a case in which an image is formed at a point in time at which the predetermined condition is satisfied, includes starting the reset work after an image forming work performed by the image former ends.

19. The image forming apparatus reset method according to claim 15, wherein the image forming apparatus includes an optical sensor having a light emitter and a light receiver, and the detecting step includes detecting the first information based on an output value of the optical sensor.

20. A non-transitory computer-readable recording medium encoded with an image forming apparatus reset program that causes a computer controlling an image forming apparatus to perform:

an image forming step of forming an image on a recording medium in accordance with an image forming condition corresponding to a medium type of the recording medium;

a detecting step of detecting information in regard to a medium type of a recording medium as first information;

a type acquiring step of accepting information in regard to a medium type of a recording medium as second information;

a resetting step of performing a reset work of setting at least one setting value that defines the image forming condition to a default value in response to satisfaction of a predetermined condition; and a restricting step of, even when a reset work is performed in the reset step, controlling the image forming apparatus to prevent second information in regard to a predetermined recording medium accepted in the type acquiring step from being reset.

* * * * *